(12) United States Patent
Hoshino

(10) Patent No.: US 7,400,741 B2
(45) Date of Patent: Jul. 15, 2008

(54) ELECTRONIC JOURNAL PREPARATION SYSTEM AND ELECTRONIC JOURNAL PREPARATION METHOD

(75) Inventor: Satoshi Hoshino, Kofu (JP)

(73) Assignee: NEC Corporation, Tokyo (JP)

( * ) Notice: Subject to any disclaimer, the term of this patent is extended or adjusted under 35 U.S.C. 154(b) by 907 days.

(21) Appl. No.: 09/895,173

(22) Filed: Jul. 2, 2001

(65) Prior Publication Data

US 2002/0003891 A1    Jan. 10, 2002

(30) Foreign Application Priority Data

Jul. 6, 2000    (JP)    ............................ P2000-205595

(51) Int. Cl.
G06K 9/00    (2006.01)
(52) U.S. Cl. ........................ 382/100; 382/118; 382/284
(58) Field of Classification Search ................ 382/100, 382/118, 115, 284; 705/18, 43, 44; 713/186, 713/182; 902/25
See application file for complete search history.

(56) References Cited

U.S. PATENT DOCUMENTS

| 4,864,108 | A |   | 9/1989 | Hamada et al. ............. 235/379 |
|---|---|---|---|---|
| 5,010,238 | A |   | 4/1991 | Kadono et al. ............. 235/379 |
| 5,422,468 | A | * | 6/1995 | Abecassis ................... 235/380 |
| 6,307,948 | B1 |   | 10/2001 | Kawasaki et al. ........... 382/100 |
| 6,731,778 | B1 | * | 5/2004 | Oda et al. ................... 382/118 |
| 6,761,308 | B1 | * | 7/2004 | Hanna et al. ................ 235/379 |
| 2002/0005899 | A1 | * | 1/2002 | Fekas et al. ................. 348/156 |

FOREIGN PATENT DOCUMENTS

| JP | 3-84665 | 4/1991 |
|---|---|---|
| JP | 3-260864 | 11/1991 |
| JP | 5-158965 | 6/1993 |
| JP | 5-233925 | 9/1993 |
| JP | 5-282527 | 10/1993 |

(Continued)

OTHER PUBLICATIONS

European Search Report dated Aug. 5, 2002.

(Continued)

*Primary Examiner*—Matthew C. Bella
*Assistant Examiner*—Shefali Patel
(74) *Attorney, Agent, or Firm*—McGinn IP Law Group, PLLC

(57) ABSTRACT

A customer selects a program in a program display portion 1. A face image pick-up portion 2 picks up a face image of a customer by a fixed camera and a card embossed image pick-up portion 3 picks up a card embossed image of a bank card by an image sensor provided at the insertion portion of the bank card. A service execution portion 4 provides a service selected by the customer such as payment, deposit or transfer of the money. A customer transaction data image processing portion 5 writes customer transaction data into a table and the table is picked up as an image. A journal data synthesizing portion 6 synthesizes the face image, the card embossed image, and the customer transaction data image into a predetermined form. A journal data storing portion 7 stores the synthesized journal data into an HDD provided in the system, and the journal data is periodically recorded in an MO (electronic recording medium).

17 Claims, 3 Drawing Sheets

FOREIGN PATENT DOCUMENTS

| | | | |
|---|---|---|---|
| JP | 06-068339 | * | 3/1994 |
| JP | 6-223093 | | 8/1994 |
| JP | 8-273022 | | 10/1996 |
| JP | 9-288753 | | 11/1997 |
| JP | 10-326312 | | 12/1998 |

OTHER PUBLICATIONS

Japanese Office Action dated Oct. 8, 2002, with partial English translation.

* cited by examiner

ELECTRONIC JOURNAL PREPARATION SYSTEM AND ELECTRONIC JOURNAL PREPARATION METHOD

BACKGROUND OF THE INVENTION

1. Field of the Invention

The present invention relates to an electronic journal as a record of transactions in banking facilities and, in particular, relates to an electronic journal preparation system and an electronic journal preparation method.

2. Description of the Related Art

Conventionally, it has been common practice in banking facilities to prepare journals and to store these journals on paper for managing personal history backgrounds. As disclosed in detail in Japanese Unexamined Patent Application, First Publication No. Hei 5-233925, an electronic management system (that is, management by electronic journal) of the personal history backgrounds is adopted in place of management on paper. It is shown in the above-described Japanese patent application that transaction data in a text format in addition to face image data corresponding to the transaction data for security purposes are recorded in an electronic journal medium. It is also disclosed in another patent application that an embosseded image of a personal card can be recorded instead of the face image data. After revision of the Commercial Law, management by electronic journals was authorized.

As described above, recently, in banking facilities, electronic management (that is, management by electronic journal) has become popular in place of paper management. However, since the transaction data is stored in the text format, a problem arises in that the personal history backgrounds can be easily altered.

SUMMARY OF THE INVENTION

An object of the present invention is to provide an electronic journal preparation system and an electronic journal preparation method, in which the personal history backgrounds are difficult to alter.

The present invention provides an electronic journal preparation system comprising: a face image pick-up portion for picking up a face image of a customer by a fixed camera, a card embossed image pick-up portion for picking up a card embossed image from a bank card when said customer inputs said bank card; a customer transaction data image processing portion for forming an image regarding customer transaction data; a journal data synthesizing portion for synthesizing journal data by assembling said face image picked up by said face image pick-up portion, said card embossed image picked up by said card embossed image pick-up portion, and said customer transaction data image picked up by said customer transaction data image processing portion; and a journal data storing portion for storing said journal data synthesized by said journal data synthesizing portion into an electronic recording medium provided in the present journal preparation system.

In the above electronic journal preparation system, said journal data synthesizing portion adds character data to a header portion of said journal data.

In the above electronic journal preparation system, said journal data synthesizing portion inserts a watermark in said customer transaction data.

The present invention provides an electronic journal preparation method comprising the steps of; picking up a face image of a customer by a fixed camera in the electronic journal preparation system (step 1); picking up a card embossed image from a bank card when said customer inputs said bank card (step 2); forming an image of a customer transaction data (step 3); synthesizing said face image, said card embossed image, and said customer transaction data image into a journal data (step 4); and storing said journal data into an electronic recording medium provided in the electronic journal preparation system (step 5).

In the above electronic journal preparation method, character data of said customer transaction data is added to the header portion of said journal data in said step 4.

In the above electronic journal preparation method, watermark data is inserted in said journal data in said step 4.

The present invention also provides an automatic teller machine which uses the above-described electronic journal preparation system.

The present invention also provides an unmanned contracting machine which uses the above-described electronic journal preparation system.

The present invention also provides a counseling terminal which uses the above-described electronic journal preparation system.

DETAILED DESCRIPTION OF THE INVENTION

Hereinafter, embodiments of the present invention will be described with reference to the attached drawings.

Figure 1:
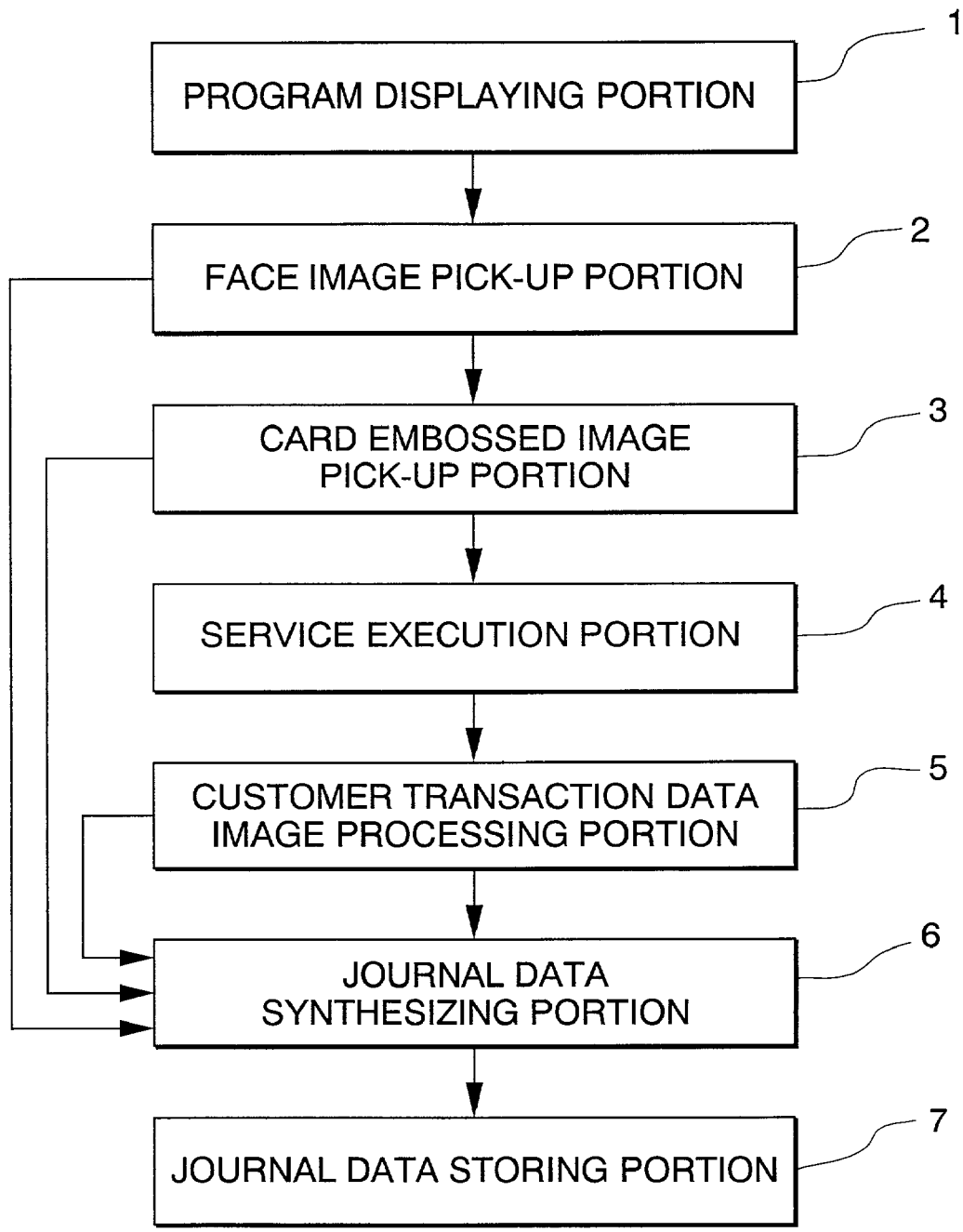
FIG. 1 is a block diagram showing one embodiment of the present invention.
Figure 2:
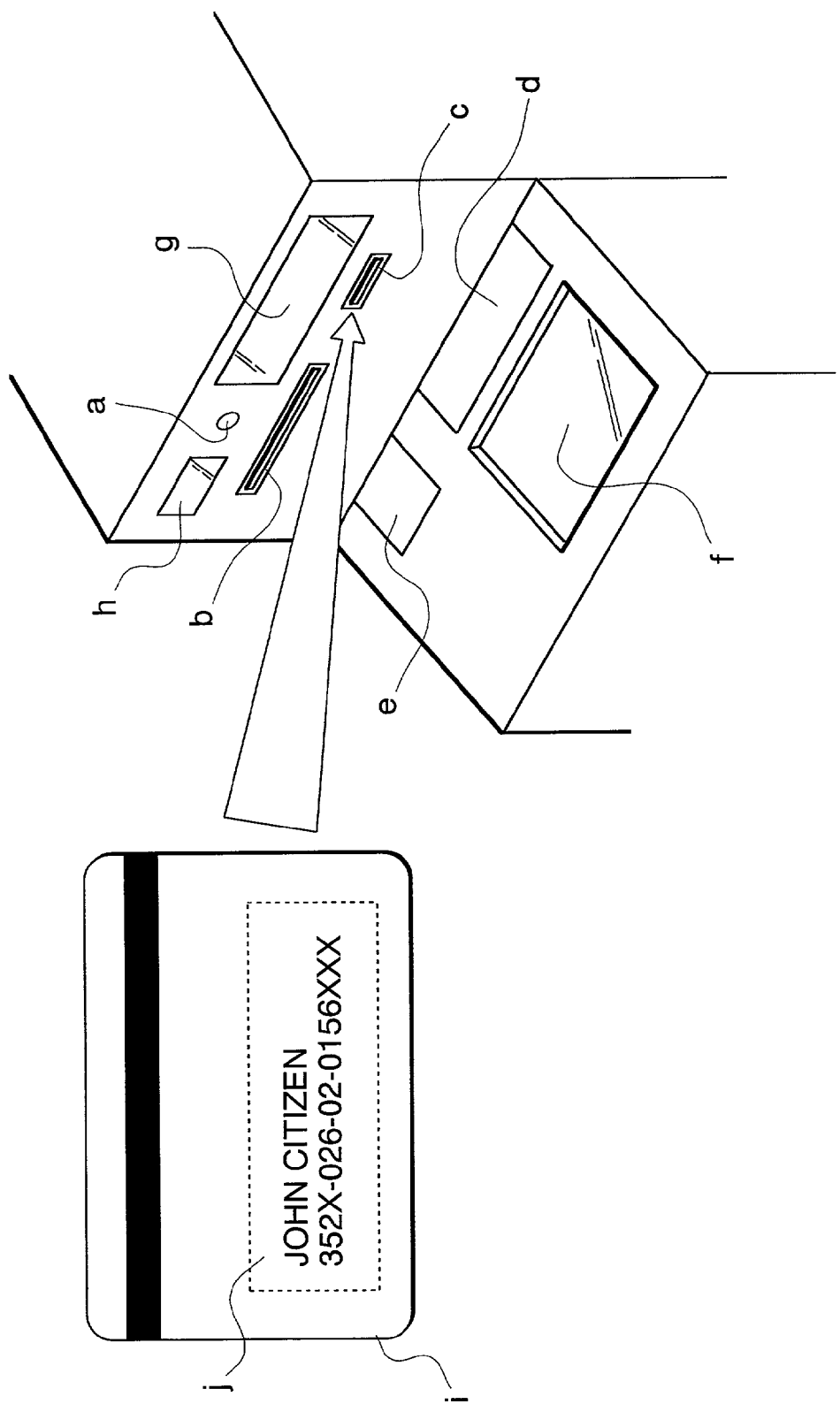
FIG. 2 is a diagram showing the external appearance of a bank terminal according to the present invention.
Figure 3:
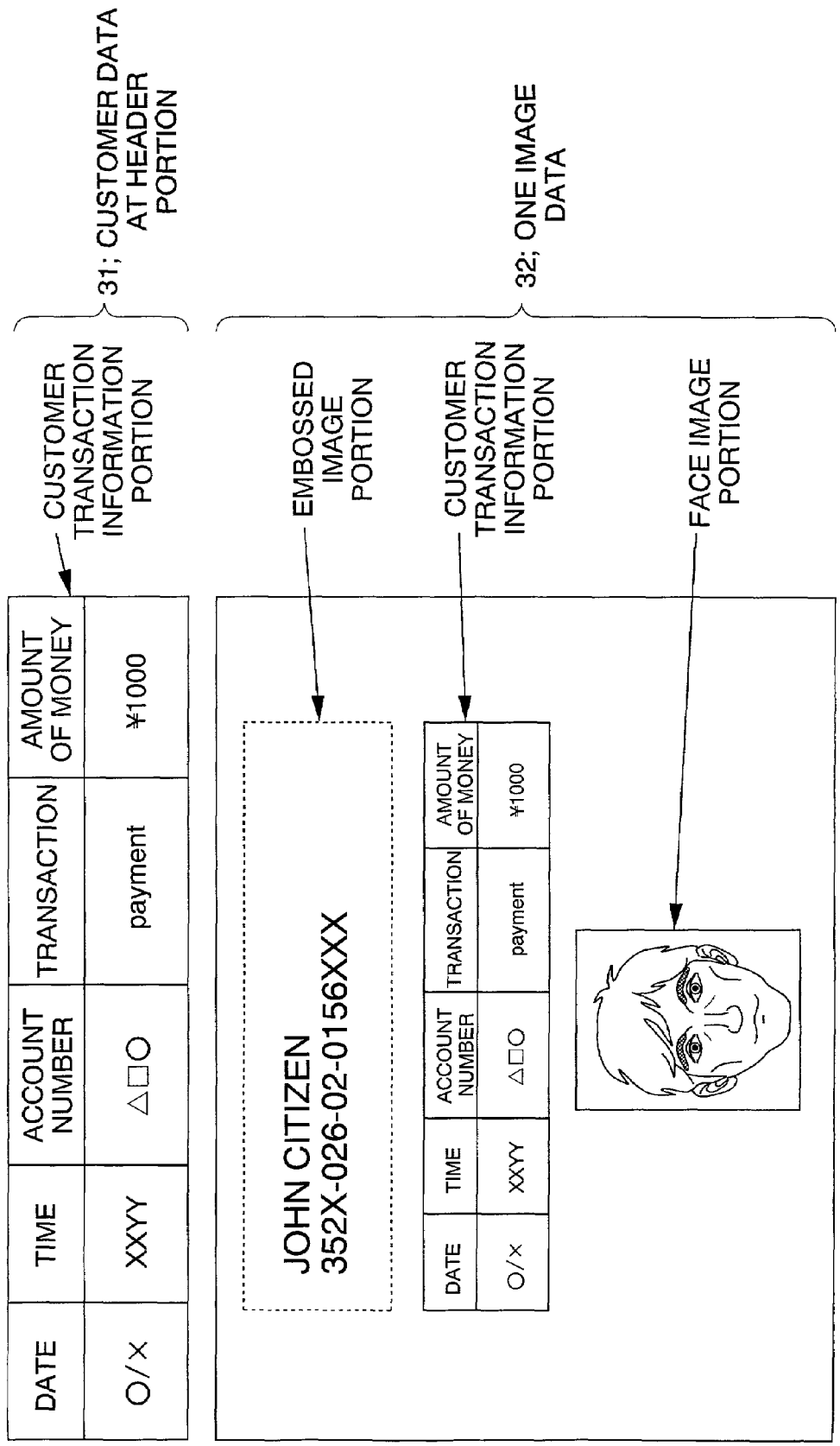
FIG. 3 is a diagram showing the results of the composition of journal data.

FIG. 1 is a block diagram showing one embodiment of the present invention. FIG. 2 is a diagram showing the external appearance of a bank terminal according to the present invention. FIG. 3 is a diagram showing an example of the results of the composition of journal data.

Referring to FIG. 1, the present invention is provided with a program display portion 1, a face image pick-up portion 2, a card embossed image pick-up portion 3, a service execution portion 4, a customer transaction data image processing portion 5, a journal data synthesizing portion 6, and a journal data storing portion 7.

The program display portion 1 indicates programs to the customer which can be selected by the customer. The face image pick-up portion 2 has a function to pick up a face image of a customer by a fixed camera. The card embossed image pick-up portion picks up a card embossed image by an image sensor provided at a bank card transfer portion. The service execution portion 4 provides a service, which is selected by a customer from a program screen among services, such as payment, deposit, and transfer of money. The customer transaction data image processing portion 5 fills up the transaction data of a customer into a prescribed table for imaging the table after executing the service by the service execution portion 4. The journal data synthesizing portion 6 has a function to synthesize a face image obtained by the face image pick-up portion 2, a card embossed image obtained by the card embossed image pick-up portion 3, and a customer transaction data image obtained by the customer transaction data image processing portion 5 into a predetermined form as a journal. The journal data storing portion 7 stores the journal data prepared by the journal data synthesizing portion 6 into an HDD provided in the system, and the data is periodically output to an MO.

The processing for imaging the customer transaction data in the customer transaction data image processing portion 5 is a conventional technique; therefore, the imaging processing will not be described.

The journal data synthesizing portion 6 synthesizes the face image, the card embossed image, and the customer transaction data image into one image 32, and adds the customer transaction data image as a character data to the header for an index.

At this time, the journal data synthesizing portion 6 forms or inserts a watermark into one image data in order to achieve a marked improvement in preventing unauthorized alteration.

Although the technique of inserting the watermark is conventionally known, it is briefly described as follows.

<Insertion of the watermark>
(1) Convert the image into frequency domains.
(2) Cognitive extraction of the important spectrum.
(3) Insert (add) an electronic watermark (vectors of the random noise) to the above-described spectrum.
(4) Register the relationship between the electronic watermark and bibliographical information.
(5) Generate an image by reverse conversion of the spectrum.

<Detection of the electronic watermark>
(1) Convert the image to be detected and the original image into spectra.
(2) Calculate the difference, that is, the electronic watermark.
(3) Compare the difference with the electronic watermark which is registered in the data base.
(4) Determine whether the watermark has been altered.

Hereinafter, the functions of a bank terminal (automatic teller machine, ATM) such as payment, deposit, and transfer of money, are described with reference to FIG. 2. The reference symbols in FIG. 2 represent the following items.

a: face image camera portion for obtaining a face image of an applicant.
b: bankbook processing portion, which is used when the applicant prints a bankbook or when the bankbook is issued.
c: card receipt portion, which processes the customer's card and which outputs a receipt after printing the transaction of the customer; the transfer portion includes an image sensor.
d: paper bill processing portion.
e: coin processing portion.
f: customer information display screen, which displays information for customers to handle the automatic teller machine.
g: handling item indicating portion, which displays items to be operated by the customer.
h: two-part display screen, which represents either that the automatic teller machine is "continue" or "terminate".
i: bank card (magnetic card).
j: embossed portion on the bank card.

The operations of the present invention will be described in detail with reference to FIGS. 1, 2, and 3.

1. The program display portion 1 displays programs on the customer information display screen f, and a customer selects for example, "payment". After selection, the program display portion 1 displays an instruction "Please look at the location where the lamp is lit, (the customer looks at an LED lit on the machine.)
2. The face image pick-up portion 2 picks up a face image using the face image camera portion a, and face image data is acquired by the automatic teller machine, which displays an instruction on the customer information display screen f "Please insert bank card into the card receipt portion". (The customer inserts the bank card i into the card receipt portion c in accordance with the instruction).
3. The card embossed portion 3 picks up an image data of the embossed portion on one surface of the bank card i, and acquires the card embossed image.
4. The service execution portion 4 executes a program selected by the customer. When the customer selects "payment", the service execution portion 4 executes payment of the money.
5. The customer transaction data image processing portion 5 forms image data of the customer transaction (for example, how much money is payed to the customer at what time).
6. The journal data synthesizing portion 6 synthesizes a face image acquired by the face image pick-up portion 2, a card embossed image acquired by the card embossed image pick-up portion 3, and the customer transaction data image acquired by the customer transaction data image processing portion 5 into a predetermined form as journal data. An example of the synthesized data corresponds to one image data 32. Furthermore, the journal data synthesizing portion 6 adds customer transaction data to the header portion for retrieval and adds information for the electronic watermark.
7. Finally, the journal data storing portion 7 stores the journal data synthesized by the journal data synthesizing portion 6 as image data into an HDD provided in the system and periodically records it in an MO (electronic storing medium).

As described above, the present invention is characterized in that the customer transaction data is stored in the journal as image data, which is synthesized by the journal data synthesizing portion 6, so that the present invention is far more effective than the conventional technique, which stores data as numerical values, in preventing the transaction data from unauthorized alteration.

The reason is that when the data is stored as numerical values, it is easy to alter the data by use of a key board even without using a particular tool. That is, it is possible to alter the data on the automatic teller machine.

However, when the customer transaction data is converted into image data, it is impossible to alter the image data on the ATM because an image editor is required for altering the image data. If the MO (electronic recording medium) is drawn out of the system for altering the data, it is necessary to return the data to the ATM which requires a lot of time.

In addition, since the present invention allows insertion of an electronic watermark into the image data, it is possible to determine whether the image data is original or has been altered, and the effect of protecting the data from alteration is further enhanced.

Note that the present invention can be applied not only to automatic teller machines but also to various systems such as unmanned contracting machines, counseling terminals, and POS systems.

As described above, the present invention has a remarkable effect in protecting personal history backgrounds from unauthorized alteration by storing journal data after synthesizing the face image, the card embossed image, and the customer transaction data image, and by inserting an electronic watermark into the image journal data.

What is claimed is:

1. An electronic journal preparation system comprising:
   a face image pick-up portion for picking up a face image of a customer by a fixed camera;

a card embossed image pick-up portion for picking up a card embossed image from a bank card when said customer inputs said bank card;

a customer transaction data image processing portion for forming an image regarding customer transaction data;

a journal data synthesizing portion for synthesizing as a single image, a journal data by assembling said face image picked up by said face image pick-up portion, said card embossed image picked up by said card embossed image pick-up portion, and said customer transaction data image picked up by said customer transaction data image processing portion; and a journal data storing portion for storing said journal data synthesized by said journal data synthesizing portion into an electronic recording medium provided in the electronic journal preparation system.

2. An electronic journal preparation system according to claim 1, wherein said journal data synthesizing portion adds character data to a header portion of said journal data.

3. An electronic journal preparation system according to claim 1, wherein said journal data synthesizing portion inserts a watermark into said customer transaction data.

4. An automatic teller machine which uses an electronic journal preparation system according to claim 1.

5. An unmanned contracting machine which uses an electronic journal preparation system according to claim 1.

6. A counseling terminal which uses an electronic journal preparation system according to claim 1.

7. An electronic journal preparation system according to claim 1, wherein said customer transaction data image processing portion formats the customer transaction data into a table for imaging the table after executing a service by a service execution portion.

8. An electronic journal preparation system according to claim 1, wherein said journal data synthesizing portion adds the customer transaction data image as a character data to a header for an index.

9. An electronic journal preparation system according to claim 1, wherein said card embossed image pick-up portion comprises an image sensor.

10. An electronic journal preparation system according to claim 1, wherein said image sensor is provided at a bank card transfer portion.

11. An electronic journal preparation system according to claim 1, wherein customer transaction data comprises data generated during a transaction conducted after said bank card is inserted into a device housing said electronic journal preparation system.

12. An electronic journal preparation system according to claim 1, wherein customer transaction data comprises data generated during a customer banking transaction.

13. An electronic journal preparation method comprising:

picking up a face image of a customer by a fixed camera in an electronic journal preparation system;

picking up a card embossed image from a bank card when said customer inputs said bank card;

forming an image of customer transaction data;

synthesizing as a single image, said face image, said card embossed image, and said customer transaction data image into journal data; and storing said journal data into an electronic recording medium provided in the electronic journal preparation system.

14. An electronic journal preparation method according to claim 13, further comprising:

adding character data of said customer transaction data to a header portion of said journal data.

15. An electronic journal preparation method according to claim 13, further comprising:

inserting a watermark data in said journal data.

16. An automatic bank teller machine, comprising:

an electronic journal preparation system comprising:

a face image pick-up portion for picking up a face image of a customer by a fixed camera;

a card embossed image pick-up portion for reading a card embossed image from a bank card when said customer inputs said bank card;

a customer transaction data image processing portion for forming an image regarding customer transaction data; and a journal data synthesizing portion for synthesizing as a single image, a journal data by assembling said face image picked up by said face image pick-up portion, said card embossed image picked up by said card embossed image pick-up portion, and said customer transaction data image picked up by said customer transaction data image processing portion.

17. The automatic bank teller machine according to claim 16, wherein said card embossed image pick-up portion is disposed inside of the automatic bank teller machine.

* * * * *